US008991779B2

(12) United States Patent
McGougan

(10) Patent No.: US 8,991,779 B2
(45) Date of Patent: Mar. 31, 2015

(54) POWER TOOL HOLDER

(75) Inventor: Robin McGougan, Enskede (SE)

(73) Assignee: Atlas Copco Industrial Technique AB, Stockholm (SE)

( * ) Notice: Subject to any disclaimer, the term of this patent is extended or adjusted under 35 U.S.C. 154(b) by 0 days.

(21) Appl. No.: 14/233,680

(22) PCT Filed: Jun. 29, 2012

(86) PCT No.: PCT/EP2012/062710
§ 371 (c)(1), (2), (4) Date: Jan. 17, 2014

(87) PCT Pub. No.: WO2013/010779
PCT Pub. Date: Jan. 24, 2013

(65) Prior Publication Data

US 2014/0183329 A1 Jul. 3, 2014

(30) Foreign Application Priority Data

Jul. 18, 2011 (SE) ...................................... 1100543

(51) Int. Cl.
*F16M 13/00* (2006.01)
*B25D 17/28* (2006.01)
*B25H 1/00* (2006.01)

(52) U.S. Cl.
CPC .............. *B25D 17/28* (2013.01); *B25H 1/0035* (2013.01)
USPC .............................. 248/548; 248/689; 248/51

(58) Field of Classification Search
CPC .............. B25G 1/00; B25G 1/04; B25G 1/06; B25H 1/0035; B25H 1/0021; A01B 1/026; B23B 39/14; B25D 17/28
USPC .................................... 248/689, 548, 674, 51
See application file for complete search history.

(56) References Cited

U.S. PATENT DOCUMENTS

| | | | | | |
|---|---|---|---|---|---|
| 2,947,204 | A | | 8/1960 | Pine et al. | |
| 3,225,443 | A | | 12/1965 | Young | |
| 3,975,068 | A | * | 8/1976 | Speckin | 248/230.5 |
| 5,546,749 | A | * | 8/1996 | Couchee | 60/370 |
| 6,021,854 | A | * | 2/2000 | Scarola | 173/170 |
| 6,704,968 | B2 | * | 3/2004 | Lau | 16/426 |
| 7,862,265 | B1 | | 1/2011 | Clark | |
| 2004/0026584 | A1 | | 2/2004 | Libbey et al. | |
| 2012/0312954 | A1 | * | 12/2012 | Rodecker et al. | 248/617 |
| 2014/0158856 | A1 | * | 6/2014 | Dudey | 248/689 |

FOREIGN PATENT DOCUMENTS

DE 85 22 998 U1 3/1986

OTHER PUBLICATIONS

International Search Report (ISR) and International Preliminary Report on Patentability (IPRP) dated Sep. 4, 2012 issued in International Application No. PCT/EP2012/062710.

* cited by examiner

*Primary Examiner* — Bradley Duckworth
(74) *Attorney, Agent, or Firm* — Holtz, Holtz, Goodman & Chick PC

(57) ABSTRACT

The invention concerns a power tool holder which includes at least two clamping parts mutually movably connected to each other by at least one adjustable connection part, the at least two clamping parts each having a clamping surface which face each other and have a clamping space formed between them, wherein a power tool can be clamped by an adjustment of the connection part to move the clamping parts together. At least one clamping part includes at least one through hole located adjacent to the clamping surface of said clamping part, such that the clamping surface will flex when subjected to pressure on clamping a power tool.

11 Claims, 3 Drawing Sheets

POWER TOOL HOLDER

FIELD OF THE INVENTION

The invention relates to a power tool holder according to the preamble of claim 1.

BACKGROUND ART

A power tool holder is depicted in FIG. 1, indicated with reference numeral 1. Such holders 1 are previously known and may be used to fasten a power tool 6 to a support arm 9, which may be telescopic. The purpose of the combination of the arm 9 and the holder 1 is to relieve a worker from the weight and torque reaction forces from the tool when using the tool, for instance in nut running or drilling with the tool. In FIG. 1, the known holder holding an angled power tool 6 is shown. The tool head is angled at 90° to the body of the tool. FIG. 2 depicts a known holder holding a straight power tool.

Such conventional power tool holders are by themselves quite uncomplicated devices, normally comprising two clamping parts that are held together by some means that can be used to force them together when clamping the power tool.

Since the force and torque that can be exerted by the power tool may be quite high, depending on the tool used, it is important that the tool is tightly fastened in the tool holder. Should the tool move in the tool holder during use, it may be detrimental to the precision with which the tool can work, for instance the amount of torque that controllably can be delivered to a screw joint. Also, the material of the tool housing in the connection region between tool and the holder may be damaged by such movements.

The importance of a firm connection between the tool and the holder is reflected in the propensity of workers to overtighten the holder when attaching it to the tool. This overtightening may in itself lead to deformation of the housing of the tool, thus damaging vital internal parts such as the gears, motor or torque transmitter.

SUMMARY OF THE INVENTION

It is an object of the present invention to propose a solution for or a reduction of the problems of prior art. A main object is consequently to reduce the risk of damaging a power tool when tightly attaching it to a power tool holder.

The invention provides a solution with a power tool holder having the features of claim 1.

By providing at least one clamping part comprising at least one through hole located adjacent to the clamping surface of said clamping part, the clamping surface will flex when under pressure clamping a power tool. This flexing translates into a larger contact surface between the clamping part and the power tool and thus the surface pressure on the power tool is decreased compared to a prior art holder clamped with the same tension in the connection part. This considerably lessens the risk of damaging the power tool when tightening the holder.

Further advantageous aspects of the invention are disclosed in the dependent claims.

BRIEF DESCRIPTION OF THE DRAWINGS

Advantageous embodiments of the invention are described below in detail with reference to the accompanying drawings. On the drawings.

DETAILED DESCRIPTION

Figure 1:
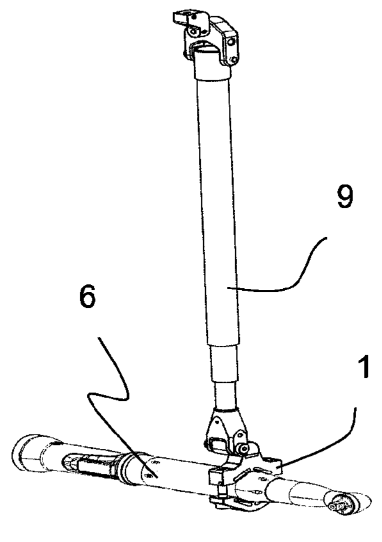
FIG. 1 illustrates a power tool holder according to prior art connected to an angled power tool.
Figure 2:
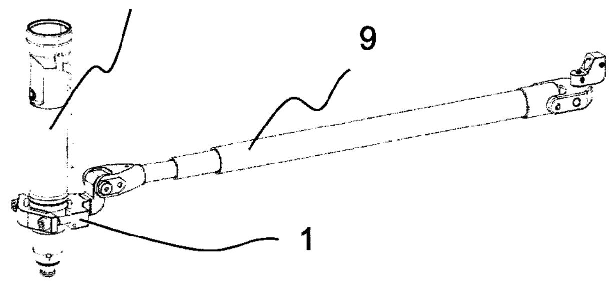
FIG. 2 illustrates a power tool holder according to prior art connected to a straight power tool.
Figure 3:
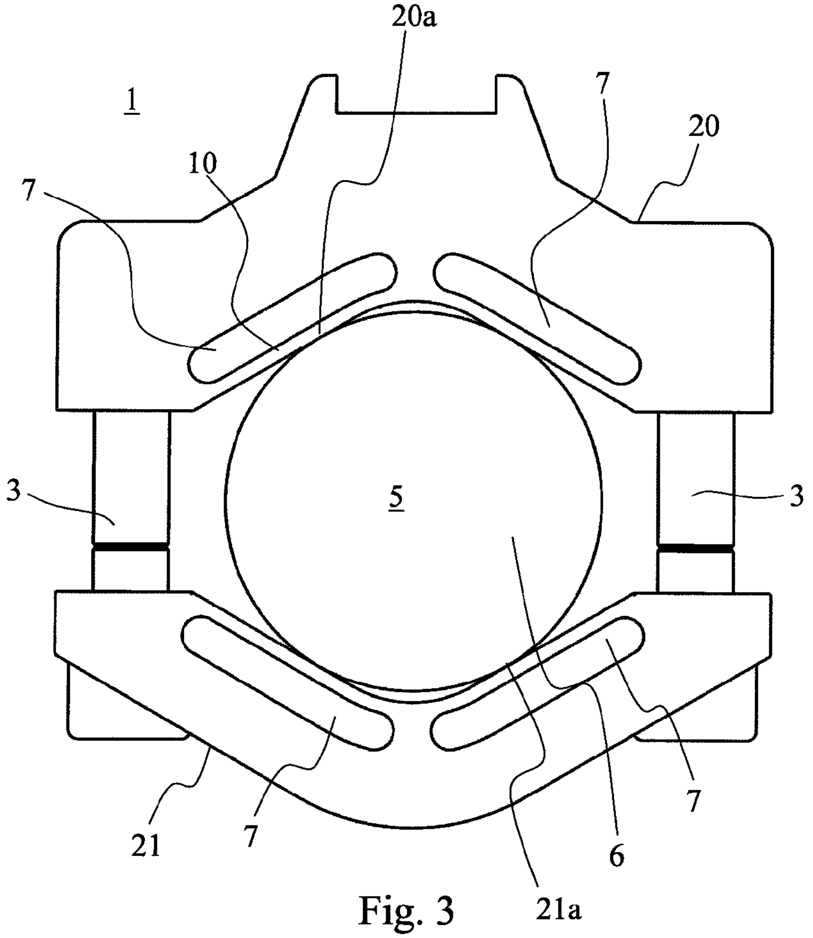
FIG. 3 illustrates a power tool holder according to the invention.

FIG. 3 illustrates as an example a power tool holder 1 comprising at least two clamping parts 20, 21 mutually movably connected to each other by at least one adjustable connection part 3. In FIG. 3, two connection parts 3 in the form of screws are shown as an example. In the figure, the clamping part 21 is provided with a hole (not shown explicitly) through which the screw 3 runs and the clamping part 20 is provided with a hole (not shown explicitly) with a thread in which the screw fits. In this way, by tightening of the screw, the clamping parts 20, 21 may be driven towards each other, clamping the tool 6 in between.

In FIG. 3 there are two connection parts, but only one may be enough. A holder according to the one in FIG. 3 with only one connection part would mean that the two connection parts would be swivellingly movable in relation to each other. This swivelling would be counteracted when the two clamping parts are close to the tool during clamping, since the tool then gets in the way preventing the swivelling. To further prevent swivelling, the single connection part could additionally comprise a control part that interconnects with a portion of each of the clamping parts. Such a control part could be a piece of material including grooves that mates with corresponding rims on the clamping parts, or vice versa, allowing mutual sliding but preventing mutual rotation of the clamping parts. Other connection parts 3 are also conceivable, as long they provide for an adjustable connection of the clamping parts. Also, the number of connection parts may also be more than one or two, for instance three or more, depending on the particular implementation.

As, seen in FIG. 3, there are at least two clamping parts 20, 21. They have each a clamping surface **20*a*, 21*a*, which clamping surfaces 20*a*, 21*a* are facing each other. In the figure, the clamping surfaces are provided in the form of an arc-like shape comprising two flat portions at an angle to each other. Between the surfaces 20*a*, 21*a*, a clamping space 5 is formed, i.e. the room 5 between the clamping parts that will accommodate the power tool 6. The power tool 6 can be clamped by an adjustment of the connection part 3 to move the clamping parts 20, 21** together, for instance by rotation of screws as mentioned above.

A distinguishing feature of the holder 1 of the invention is that at least one clamping part 20, 21 comprises at least one through hole 7 located adjacent to the clamping surface **20*a*, 21*a* of said clamping part 20, 21 such that the clamping surface 20*a*, 21*a* will flex when under pressure clamping a power tool 6. This flexing is due to the relatively thin wall 10 of material, between the hole 7 and the clamping surface, that will yield somewhat when under pressure. The flexing of the clamping surface provides a larger contact surface between the clamping part 20, 21 and the power tool 6 leading to a lower surface pressure on the tool 6 for a given clamping tension in the connection part(s). At least one through hole 7, as mentioned earlier, is needed in order to provide this benefit. However more holes may also be provided, as is the case in FIG. 3**. It should be noted that even though the surface pressure on the power tool will be lower, the frictional force between the power tool and the holder stays the same for a given tension in the connection part(s) since the contact surface between the tool and the holder has increased due to the flexing of the clamping surface(s).

Thus, instead of making contact substantially along a line formed by the points of contact between the power tool and the holder as in the prior art, the contact surface according to the holder of the invention will be in the form of a surface due to the flexing of the clamping surfaces of the invention.

As mentioned, the power tool holder 1 according to the invention may comprise at least one clamping surface 20*a*, 21 that comprises two flat portions. Such portions may be directed towards the clamping space 5 at an angle of less than 180° between them, as seen in FIG. 3. This makes it possible to use the power tool holder with power tools of different diameters; each such different tool will make contact with the two flat portions of the clamping surface at slightly different positions. Thus, a universal clamping character of the tool holder is afforded.

Figure 4:
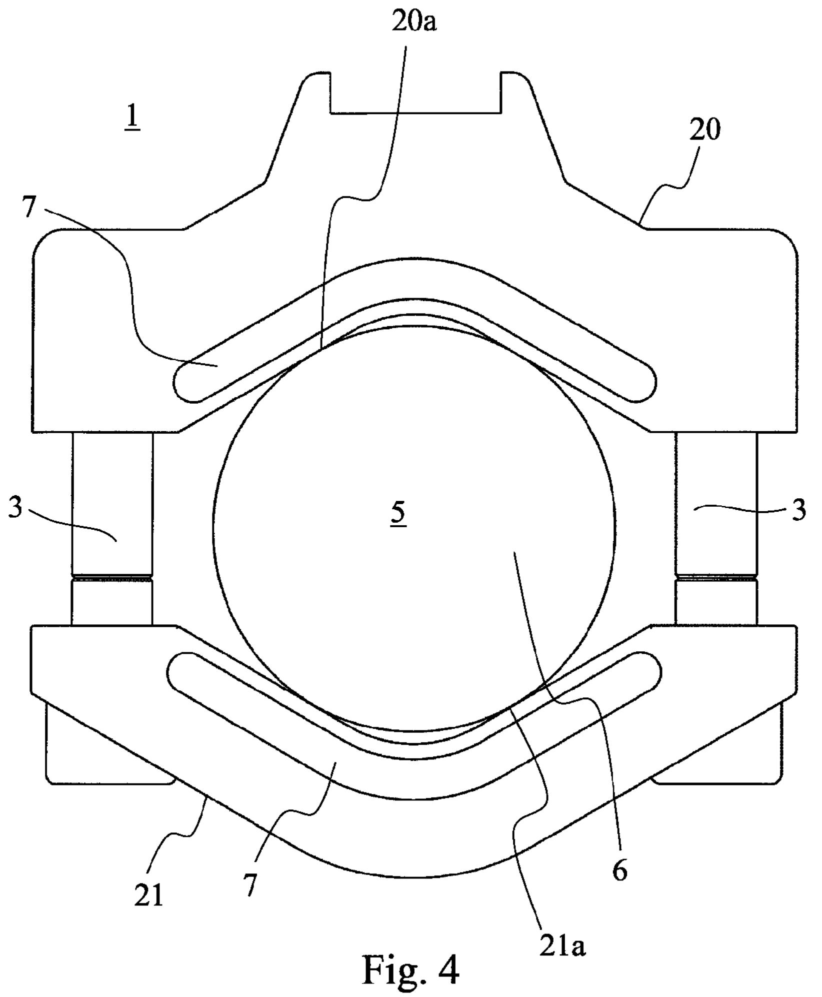
FIG. 4 illustrates another power tool holder according to the invention.

A particular case of the power tool holder 1 according to the invention would be a tool holder where each clamping surface 20*a*, 21*a* of two clamping parts 20, 21 comprises two flat portions directed towards the clamping space 5 at an angle of less than 180° between them. This resembles the case of FIGS. 3 and 4 and constitutes a stable solution that firmly will clamp a tool.

It should be noted that other peripheries of the clamping surfaces, even convex ones, given the right flex of the surface are possible.

As has been mentioned, at least one through hole 7 should be provided in at least one clamping part of the tool holder. A power tool holder 1 according to any of the embodiments of the invention wherein each clamping part 20, 21 comprises at least one such through hole 7 would provide the benefit of further reducing surface pressure on a tool when clamped with a given tension in the connection part(s). Also, since all clamping parts in this case have a clamping surface that flexes, the overall distribution of surface pressure on a clamped tool will be more even. The through holes would be located adjacent to the clamping surface 20*a*, 21*a* of said each clamping part 20, 21.

A variant of the previous embodiment would be a power tool holder wherein each clamping part 20, 21 comprises one through hole 7. Such an embodiment is depicted as an example in FIG. 4. Having only one hole potentially means less machining steps when producing the power tool holder, so production cost may be lower.

In any of the embodiments of the power tool holder 1 according the invention, a through hole 7 may have a cross section form of an elongated oval. This form of the hole has been depicted as an example in FIGS. 3 and 4 and has the advantage of providing a good flexibility along the clamping surface. In this way, power tools having different diameters that engage with different portions of the clamping surface could be accommodated.

The power tool holder 1 according to any of the previous embodiments may in one embodiment comprise two adjustment parts 3 interconnecting the clamping parts 20, 21. This is a straightforward solution that provides a balanced pressure when clamping a power tool. It has been shown as an example in the FIGS. 3 and 4.

A suitable material for a clamping part 20, 21 comprising at least one through hole 7 is high-tensile steel having a yield strength between around 750-1500 MPa, for instance about 900-1100 MPa. This choice of material provides good flexibility with moderate material use and such material also does not suffer from material fatigue. Of course, other materials may also be used, such as other metals or synthetic materials.

A through hole 7 in a clamping part may be filled with a material which is softer than the material of the clamping part, preferably a highly flexible material in order not to impair the flexing ability of the clamping surface. Filling a hole with such a material would for instance prevent the hole from getting caught on some protruding object when moving the power tool holder about.

The invention also comprises an assembly comprising a power tool holder 1 according to any of the previous embodiments and a support arm 9. The assembly may further comprise a power tool 6.

The invention claimed is:

1. A power tool holder comprising:

at least two clamping parts mutually movably connected to each other by at least one adjustable connection part, the at least two clamping parts each having a clamping surface facing each other to form a clamping space between them, wherein a power tool may be clamped by an adjustment of the at least one adjustable connection part to move the at least two clamping parts together;

wherein at least one of said at least two clamping parts comprises at least one through hole located adjacent to the clamping surface of said at least one clamping part, such that a wall is formed between the clamping surface of said at least one clamping part and the through hole, and such that the clamping surface of said at least one clamping part is configured to flex when subjected to pressure upon clamping the power tool.

2. The power tool holder according to claim 1, wherein at least one of said at least two clamping surfaces comprises two flat portions that face the clamping space at an angle of less than 180° between them.

3. The power tool holder according to claim 1, wherein each clamping surface of each of said two clamping parts comprises two flat portions directed towards the clamping space at an angle of less than 180° between them.

4. The power tool holder according to claim 1, wherein each clamping part comprises at least one through hole located adjacent to the clamping surface of said each clamping part.

5. The power tool holder according to claim 2, wherein each flat portion comprises one adjacent through hole.

6. The power tool holder according to claim 1, wherein the through hole has a cross sectional form of an elongated oval.

7. The power tool holder according to claim 1, wherein said at least two clamping parts are mutually movably connected to each other by two adjustable connection parts.

8. The power tool holder according to claim 1, wherein said at least one clamping part comprising said at least one through hole is made of high-tensile steel having a yield strength between 750 MPa and 1500 MPa.

9. An assembly comprising:

the power tool holder according to claim 1; and a support arm.

10. The assembly according to claim 9, further comprising the power tool.

11. The power tool holder according to claim 8, wherein said at least one clamping part comprising said at least one through hole is made of high-tensile steel having a yield strength between 900 MPa and 1100 MPa.

* * * * *